US012257993B2

(12) United States Patent
Thomson

(10) Patent No.: US 12,257,993 B2
(45) Date of Patent: Mar. 25, 2025

(54) MOTORCYCLE BRAKING ARRANGEMENT

(71) Applicant: One Brake Pty Ltd, Hamersley (AU)

(72) Inventor: Jay Leroy Thomson, Hamersley (AU)

(73) Assignee: ONE BRAKE PTY LTD, Hamersley (AU)

( * ) Notice: Subject to any disclaimer, the term of this patent is extended or adjusted under 35 U.S.C. 154(b) by 250 days.

(21) Appl. No.: 17/627,615

(22) PCT Filed: Jul. 15, 2020

(86) PCT No.: PCT/AU2020/050729
§ 371 (c)(1),
(2) Date: Jan. 14, 2022

(87) PCT Pub. No.: WO2021/007617
PCT Pub. Date: Jan. 21, 2021

(65) Prior Publication Data
US 2022/0281425 A1 Sep. 8, 2022

(30) Foreign Application Priority Data
Jul. 15, 2019 (AU) .................................. 2019902494

(51) Int. Cl.
B60T 8/17 (2006.01)
B60T 8/171 (2006.01)
(Continued)

(52) U.S. Cl.
CPC ............ *B60T 8/1706* (2013.01); *B60T 8/171* (2013.01); *B60T 8/172* (2013.01); *B60T 8/261* (2013.01);
(Continued)

(58) Field of Classification Search
CPC ........ B60T 8/17; B60T 8/1701; B60T 8/1706; B60T 8/171; B60T 8/172; B60T 8/1766;
(Continued)

(56) References Cited

U.S. PATENT DOCUMENTS 6,179,390 B1   1/2001  Guzorek et al.
6,273,523 B1*  8/2001  Wakabayashi ............ B62L 3/08
                                                    303/9.64
(Continued)

FOREIGN PATENT DOCUMENTS

DE   102006017302 A1   10/2007
DE   102013210562 A1   12/2014
(Continued)

OTHER PUBLICATIONS

International Search Report for International Application No. PCT/AU2020/050729, mailed Sep. 3, 2020, 6 pages.

(Continued)

*Primary Examiner* — Erick R Solis
(74) *Attorney, Agent, or Firm* — TraskBritt

(57) ABSTRACT

A motorcycle braking arrangement comprising a brake lever (and/or brake pedal) defining a grasping or stepping surface, respectively, whereby a rider is able to apply pressure in order to produce a first analogue signal, a force-sensitive resistor (FSR) mounted on and/or in the surface and configured to produce a second analogue signal. In this manner, pressure applied to the grasping surface results in simultaneous production of the first and second signals, whereby a controller is configured to electronically correlate the second signal with the first. The arrangement also includes at least one servomechanism, which is arranged in signal communication with the controller and is configured to actuate a brake of the motorcycle according to the correlation between the first and second signals.

13 Claims, 6 Drawing Sheets

(51) Int. Cl.
  *B60T 8/172* (2006.01)
  *B60T 8/26* (2006.01)
  *B62L 3/02* (2006.01)
  *B62L 3/04* (2006.01)
  *B62L 3/08* (2006.01)
  *B62J 6/24* (2020.01)
  *B62J 45/00* (2020.01)

(52) U.S. Cl.
  CPC .............. *B62L 3/02* (2013.01); *B62L 3/04* (2013.01); *B62L 3/08* (2013.01); *B60T 2210/32* (2013.01); *B60T 2230/02* (2013.01); *B60T 2250/00* (2013.01); *B60T 2250/02* (2013.01); *B60T 2250/03* (2013.01); *B62J 6/24* (2020.02); *B62J 45/00* (2020.02)

(58) Field of Classification Search
  CPC ............ B60T 2230/02; B60T 2250/02; B60T 2250/03; B60T 2250/04; B60T 8/261; B62L 3/02; B62L 3/023; B62L 3/04; B62L 3/08
  USPC ........................................ 701/70, 71, 78, 79
  See application file for complete search history.

(56) References Cited

U.S. PATENT DOCUMENTS

| | | | |
|---|---|---|---|
| 6,309,029 | B1 | 10/2001 | Wakabayashi et al. |
| 6,409,285 | B1 * | 6/2002 | Wakabayashi ............ B62L 3/08 303/9.64 |
| 8,706,358 | B2 | 4/2014 | DeWitt |
| 2003/0098610 | A1 | 5/2003 | Bradsen et al. |
| 2004/0046444 | A1 * | 3/2004 | Heubner ............... B60T 8/3225 303/113.5 |
| 2005/0146207 | A1 * | 7/2005 | Wagner ................ B60T 11/101 303/9.64 |
| 2006/0028064 | A1 | 2/2006 | Beulich et al. |
| 2010/0066160 | A1 * | 3/2010 | Atsushi ................ B60T 8/3225 303/9.64 |
| 2011/0233994 | A1 | 9/2011 | Harding et al. |
| 2020/0369158 | A1 * | 11/2020 | Marx ........................ B60L 7/26 |

FOREIGN PATENT DOCUMENTS

| | | |
|---|---|---|
| EP | 0190411 A2 | 8/1986 |
| EP | 0768224 A1 | 4/1997 |
| EP | 0814981 A1 | 1/1998 |
| EP | 1594730 B1 | 12/2010 |
| EP | 2311700 A1 | 4/2011 |
| JP | 10-273087 A | 10/1998 |
| JP | 2000-142357 A | 5/2000 |
| JP | 2006-513904 A | 4/2006 |
| JP | 2018-162034 A | 10/2018 |
| WO | 2019/096683 A1 | 5/2019 |

OTHER PUBLICATIONS

International Written Opinion for International Application No. PCT/AU2020/050729, mailed Sep. 3, 2020, 8 pages.

Chinese First Office Action for Chinese Application No. 202080064502, dated Oct. 18, 2023, 11 pages with translation.

Chinese Search Report for Chinese Application No. 202080064502, dated Oct. 18, 2023, 2 pages.

Chinese Second Office Action for Chinese Application No. 202080064502, dated Jul. 6, 2024, 9 pages with translation.

European Extended Search Report and Opinion for European Application No. 20839956.8, dated Jul. 14, 2023, 9 pages.

Japanese Notice of Reasons for Refusal for Japanese Application No. 2022-502291, dated Aug. 20, 2024, 9 pages with English translation.

European Communication pursuant to Article 94(3) EPC for European Application No. 20839956.8, dated Dec. 23, 2024, 4 pages.

* cited by examiner

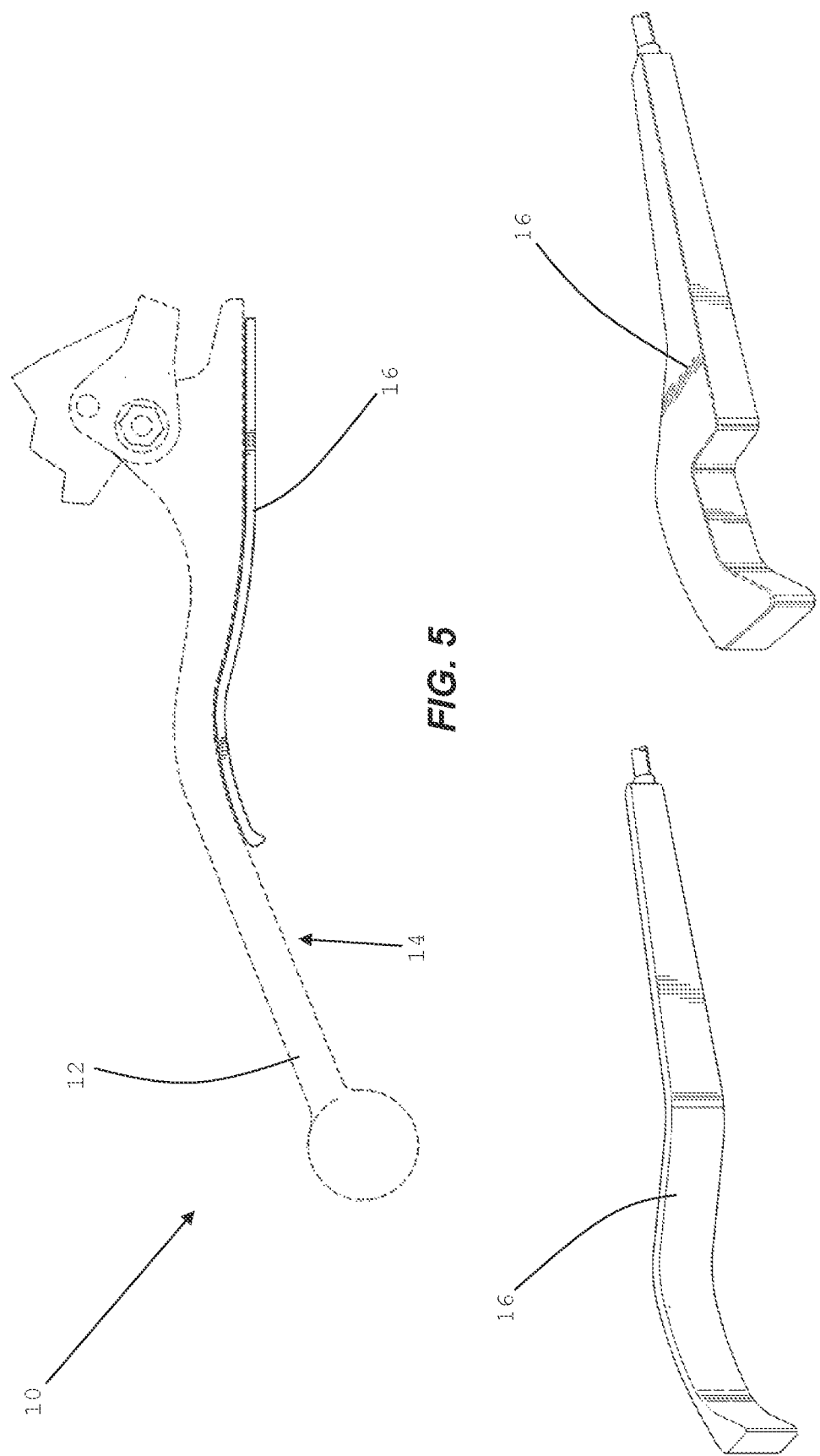

MOTORCYCLE BRAKING ARRANGEMENT

CROSS-REFERENCE TO RELATED APPLICATIONS

This application is a national phase entry under 35 U.S.C. § 371 of International Patent Application PCT/AU2020/050729, filed Jul. 15, 2020, designating the United States of America and published as International Patent Publication WO 2021/007617 A1 on Jan. 21, 2021, which claims the benefit under Article 8 of the Patent Cooperation Treaty to Australian Patent Application Serial No. 2019902494, filed Jul. 15, 2019.

TECHNICAL FIELD

This disclosure relates to motorcycle braking, in general, and more specifically to a motorcycle brake lever/pedal, a motorcycle braking arrangement, and a motorcycle including such a braking arrangement.

BACKGROUND

The following discussion of the background art is intended to facilitate an understanding of the present disclosure only. The discussion is not an acknowledgement or admission that any of the material referred to is or was part of the common general knowledge as at the priority date of the application.

Motorcycle braking systems have varied throughout time, as motorcycles evolved from bicycles with an engine attached, to high-powered racing machines capable of speeds in excess of 350 km/h. Most systems work by converting kinetic energy into thermal energy (heat) by friction. On motorcycles, approximately 70% of the braking effort is performed by the front brake. This however can vary for individual motorcycles; longer-wheelbase types having more weight biased rearward, such as cruisers and tourers, can have a greater effort applied by the rear brake. In contrast, sports bikes with a shorter wheelbase and more vertical fork geometry can tolerate higher front braking loads. For these reasons, motorcycles tend to have a vastly more powerful front brake compared to the rear.

On most conventional motorcycles, the front and rear brakes are controlled individually, with a front brake lever proximate a hand grip and a rear brake pedal mounted proximate a foot peg, although so-called linked braking systems exist, often sharing a common hydraulic connection between the front and rear brakes.

In general, the front brake is the most effective of the two brakes, providing the majority of a motorcycle's stopping power, contingent on surface conditions. A large percentage of weight of a motorcycle and rider is transferred forward onto the front wheel and suspension when the brakes are applied. The weight transfer that happens under braking on a motorcycle compresses the front forks and then pushes down on the front tire, enlarging the contact patch and thereby increasing the grip. With most of the weight transferring to the front wheel under braking, the back wheel has a tendency to become light under braking and because of this, the rear wheel can lock up quite readily if over-applied. If the rear wheel does lock it may cause the motorcycle to skid and may lead to subsequent loss of control.

For this reason, many riders do not use the rear brake correctly out of fear of locking the rear wheel and risking a skid. However, correct application of the rear brake can assist in lowering the motorcycle to allow better control and improved all-round braking performance.

Similarly, many off-road riders do not use the rear brake at all under certain conditions, as the feet are required to maintain control, especially when a rider stands on the foot pegs. In such circumstances, application of the rear brake can be extremely beneficial, but is generally not done out of necessity to maintain better control.

In addition, actuation of a separate control whilst riding a motorcycle can be dangerous, as a rider is already generally tasked with a plurality of controls, e.g., front brake, rear brake, throttle, clutch, typically one per extremity, i.e., one each per hand and foot. There thus exists a need in the art for an improved motorcycle braking arrangement, particularly concerning ergonomics, i.e., intuitive rider-motorcycle interaction.

Earlier hydraulic improvements to motorcycle braking were developed (see, for example, PCT/AU2019/050032) and have identified additional shortcomings in the art of motorcycling braking. The current disclosure was conceived with these shortcomings in mind.

BRIEF SUMMARY

The skilled addressee is to appreciate that reference herein to a motorcycle is non-exhaustive and includes reference to any suitable vehicle, such as a bicycle, a tricycle or similar wheeled vehicles.

In addition, it is to be appreciated that reference herein to a servomechanism generally refers to an automatic device that uses error-sensing negative feedback to correct the action of a mechanism. Such a servomechanism usually includes a built-in encoder or other position feedback mechanism to ensure the output is achieving the desired effect. The feedback or error-correction signals or such a feedback typically helps control mechanical position, speed or other parameters, as required.

According to a first aspect of the disclosure there is provided a motorcycle brake lever comprising:
  a lever body defining a grasping surface whereby a rider is able to operatively apply pressure with at least one finger in order to produce a first analogue signal; and
  a force-sensitive resistor (FSR) mounted on and/or in the grasping surface, the FSR configured to produce a second analogue signal;
  wherein pressure applied results in simultaneous production of the first and second signals, the second signal electronically correlatable with the first.

Typically, the FSR is configured to be selectively relocatable on the grasping surface to allow rider-customization according to requirements.

It is to be appreciated that the first signal is typically a mechanical signal, whereas the second signal is typically an electronic signal.

According to a second aspect of the disclosure there is provided a motorcycle brake pedal comprising:
  a pedal body defining a stepping surface whereby a rider is able to operatively apply pressure with a foot in order to produce a first analogue signal; and
  a force-sensitive resistor (FSR) mounted on and/or in the stepping surface, the FSR configured to produce a second analogue signal;
  wherein pressure applied results in simultaneous production of the first and second signals, the second signal electronically correlatable with the first.

Typically, the FSR is configured to be selectively relocatable on the stepping surface to allow rider-customization according to requirements.

The skilled addressee is to appreciate that, although reference is made to a brake lever, the disclosure is also applicable to a clutch lever, or the like.

According to a third aspect of the disclosure there is provided a motorcycle braking arrangement comprising:
- a brake lever and/or brake pedal defining a grasping or stepping surface, respectively, whereby a rider is able to apply pressure in order to produce a first analogue signal, a force-sensitive resistor (FSR) mounted on and/or in the surface and configured to produce a second analogue signal, wherein pressure applied results in simultaneous production of the first and second signals;
- a controller configured to electronically correlate the second signal with the first in a predetermined manner; and
- at least one servomechanism arranged in signal communication with the controller and configured to actuate a brake of the motorcycle according to the correlation between the first and second signals.

Typically, the arrangement includes an adjustor arranged in signal communication with the controller, the adjustor configured to adjust a ratio and/or manner at which the controller correlates the second signal with the first.

Typically, the adjustor comprises a sensitivity adjustor configured to adjust a sensitivity of the FSR thereby indirectly adjusting the correlation ratio between the first and second signals.

Typically, the arrangement includes at least one sensor arranged in signal communication with the controller, the sensor configured to sense an operating characteristic of the motorcycle and to adjust a ratio at which the controller correlates the second signal with the first according to such sensed operating characteristic.

Typically, the operating characteristic of the motorcycle is selected from a non-exhaustive group consisting of a velocity of the motorcycle, a lean angle of the motorcycle, a longitudinal orientation of the motorcycle, a loaded weight of the motorcycle, a presence of an object proximate the motorcycle, an immobilizer security condition of the motorcycle, an engine condition of the motorcycle, or the like.

Typically, the braking arrangement is configured such that the first signal actuates a brake on one wheel, with the servomechanism configured to actuate a brake on another wheel according to the correlation, i.e., first signal actuates the front brake and the servomechanism actuates the rear brake according to the correlation, or vice versa.

In an embodiment, the servomechanism is configured to engage with an existing brake system of the motorcycle.

In such an embodiment, the servomechanism may be configured to actuate the existing brake system via a tension connection (rather than compression) to minimize interference with normal manual actuation of the brake system.

In an embodiment, the servomechanism includes an off-center tension connection to the brake system, whereby rotation of part of the servomechanism is translated to a translation force to actuate the brake system.

In another embodiment, the servomechanism is configured to directly actuate or engage a brake caliper and/brake pad of the motorcycle.

In an embodiment, the controller is configured to activate a braking indicator of the motorcycle, such as a brake light, according to the correlation between the first and second signals.

In an embodiment, the servomechanism is arranged in wireless signal communication with the controller.

In an embodiment, the controller is configured to disengage a clutch of the motorcycle according to a magnitude of the second signal and/or the correlation between the first and second signals.

Typically, the FSR is configured to be selectively relocatable on the surface to allow rider-customization according to requirements.

According to a fourth aspect of the disclosure there is provided a motorcycle comprising:
- a brake lever and/or brake pedal defining a grasping or stepping surface, respectively, whereby a rider is able to apply pressure in order to produce a first analogue signal, a force-sensitive resistor (FSR) mounted on and/or in the surface and configured to produce a second analogue signal, wherein pressure applied results in simultaneous production of the first and second signals;
- a controller configured to electronically correlate the second signal with the first; and
- at least one servomechanism arranged in signal communication with the controller and configured to actuate a brake of the motorcycle according to the correlation between the first and second signals;
- wherein the first signal actuates a brake on one wheel, with the servomechanism configured to actuate a brake on another wheel according to the correlation.

Typically, the motorcycle includes an adjustor arranged in signal communication with the controller, the adjustor configured to adjust a ratio and/or manner at which the controller correlates the second signal with the first.

Typically, the adjustor comprises a sensitivity adjustor configured to adjust a sensitivity of the FSR thereby indirectly adjusting the correlation ratio between the first and second signals.

Typically, the motorcycle includes at least one sensor arranged in signal communication with the controller, the sensor configured to sense an operating characteristic of the motorcycle and to adjust a ratio at which the controller correlates the second signal with the first according to such sensed operating characteristic.

Typically, the operating characteristic of the motorcycle is selected from a non-exhaustive group consisting of a velocity of the motorcycle, a lean angle of the motorcycle, a longitudinal orientation of the motorcycle, a loaded weight of the motorcycle, a presence of an object proximate the motorcycle, an immobilizer security condition of the motorcycle, an engine condition of the motorcycle, or the like.

In an embodiment, the servomechanism is configured to engage with an existing brake system of the motorcycle.

In such an embodiment, the servomechanism may be configured to actuate the existing brake system via a tension connection (rather than compression) to minimize interference with normal manual actuation of the brake system.

In another embodiment, the servomechanism is configured to directly actuate or engage a brake caliper and/brake pad of the motorcycle.

In an embodiment, the controller is configured to activate an analogue braking indicator of the motorcycle according to the correlation between the first and second signals.

In an embodiment, the controller is configured to disengage a clutch of the motorcycle according to a magnitude of the second signal and/or the correlation between the first and second signals.

BRIEF DESCRIPTION OF THE DRAWINGS

The description will be made with reference to the accompanying drawings in which:

FIG. 5 is a diagrammatic perspective-view representation of a motorcycle brake lever in accordance with as aspect of the present disclosure;

FIG. 6 is a diagrammatic perspective-view representation of an embodiment of a force-sensitive resistor (FSR) mountable to the brake lever of FIG. 5;

FIG. 7 is a diagrammatic perspective-view representation of another embodiment of a force-sensitive resistor (FSR) mountable to the brake lever of FIG. 5.

DETAILED DESCRIPTION

Figure 1:
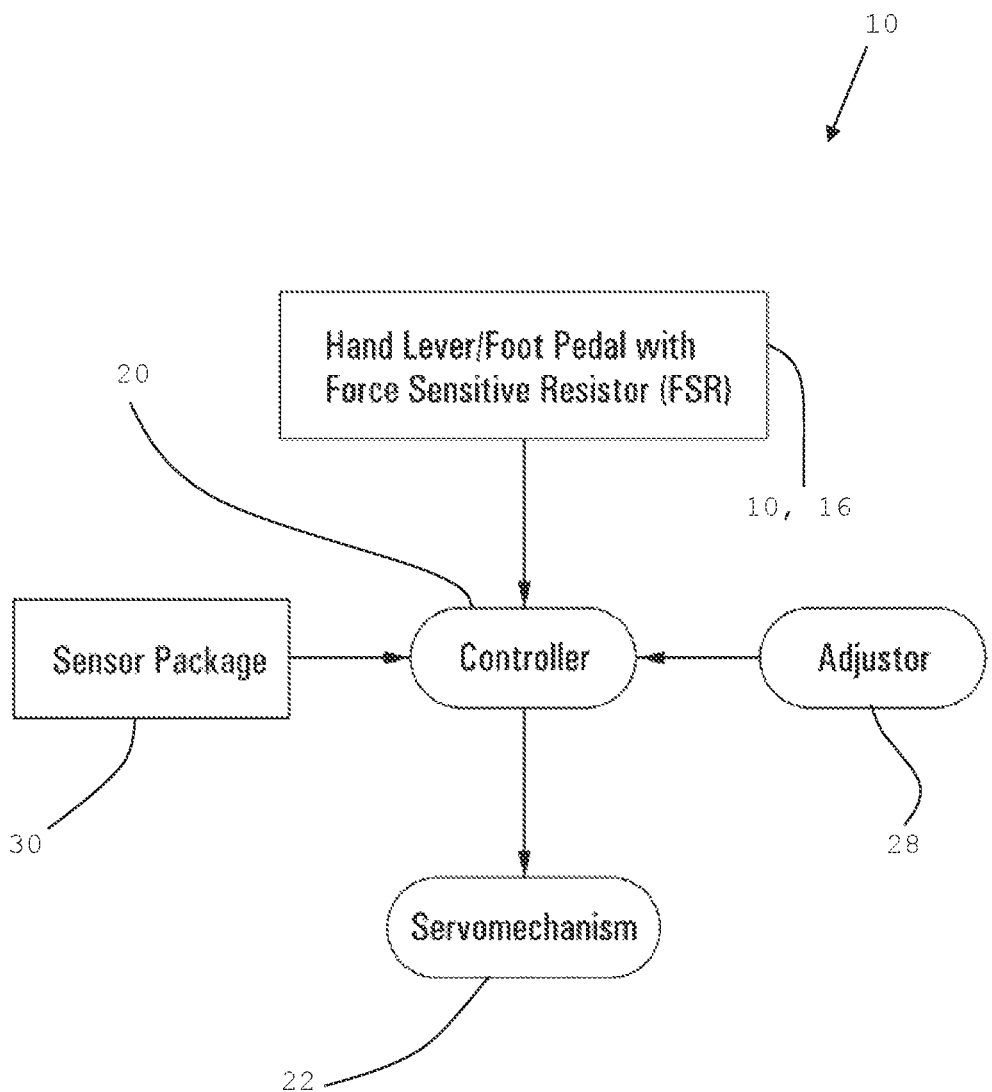
FIG. 1 is a diagrammatic representation of constituent parts of an embodiment of a motorcycle braking arrangement, in accordance with the present disclosure.
Figure 2:
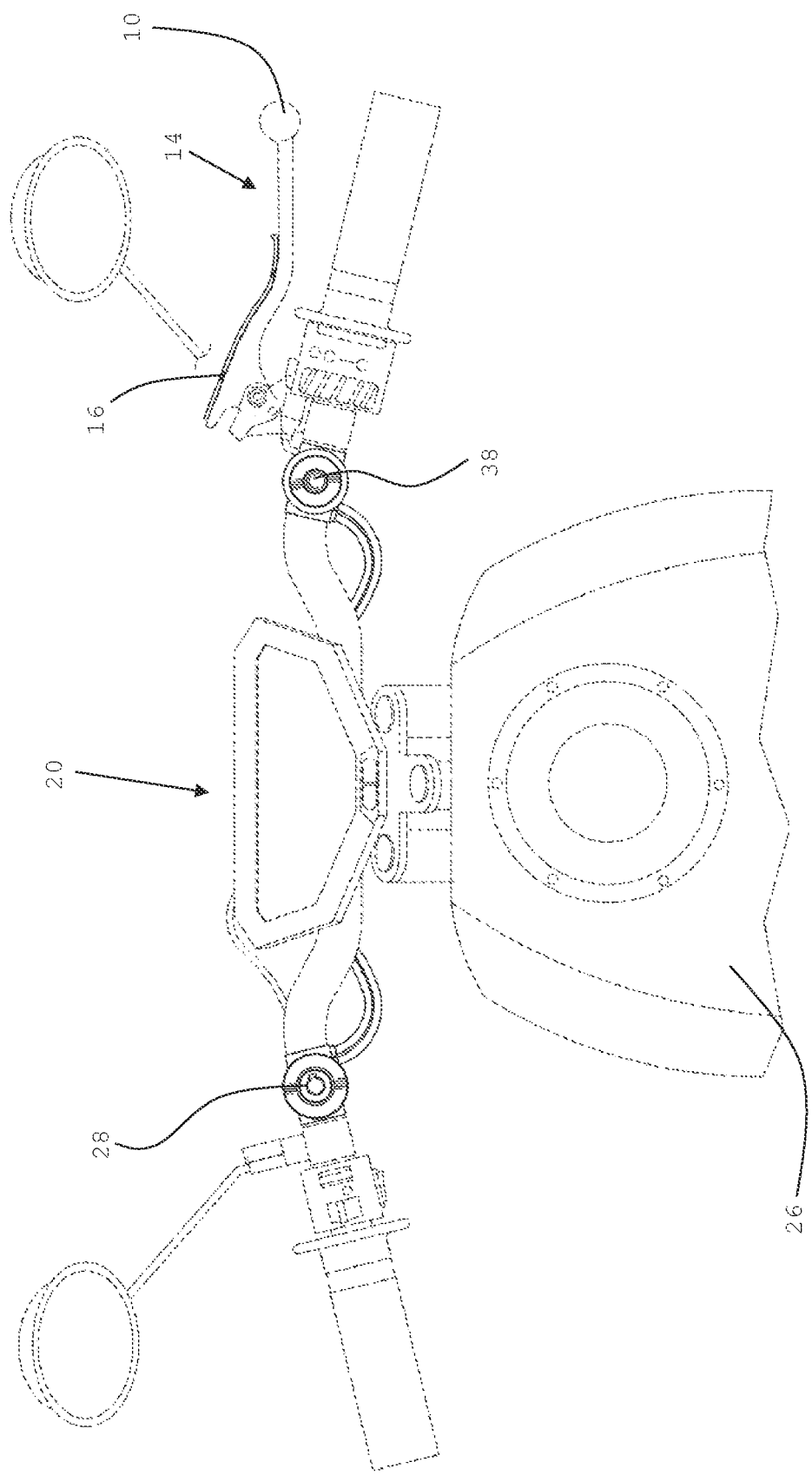
FIG. 2 is a diagrammatic representation of a rider-view of a motorcycle handlebar showing aspects of the motorcycle braking arrangement of FIG. 1.

Further features of the present disclosure are more fully described in the following description of several non-limiting embodiments thereof. This description is included solely for the purposes of exemplifying the present disclosure to the skilled addressee. It should not be understood as a restriction on the broad summary, disclosure or description of the disclosure as set out above. In the figures, incorporated to illustrate features of the example embodiment or embodiments, like reference numerals are used to identify like parts throughout.

The skilled addressee is to appreciate that reference herein to an analogue signal is generally used to refer to a measure or representation data by means of one or more physical properties that can express any value along a continuous scale, as opposed to a digital representation where data is represented by discrete value, such as zero and one. For example, a conventional motorcycle brake lever or pedal generally produces a mechanical analogue signal when part of a hydraulic braking system, which allows analogue control of a braking force.

With reference firstly to FIGS. 5 to 7 of the accompanying drawings, there is shown an embodiment of a motorcycle brake lever 10, in accordance with the present disclosure, which broadly comprises a lever body 12 and a force-sensitive resistor (FSR) 16. The lever body 12 generally defines a grasping surface 14 whereby a rider is able to operatively apply pressure with at least one finger in order to produce a first analogue signal, and the force-sensitive resistor (FSR) 16 is mounted on and/or in the grasping surface 14, the FSR 16 configured to produce a second analogue signal.

In this manner, when pressure is applied to the grasping surface 14 of the brake lever 10, the first and second analogue signals are simultaneously produced via a single pressure input, with the second signal electronically correlatable with the first. It is to be appreciated that the first signal is typically a mechanical signal, i.e., conventional input from the brake lever 10, whereas the second signal is typically an electronic signal, i.e., an electronic analogue signal produced by the FSR 16.

As a result, a conventional brake lever can be used to produce more than one analogue output from a single input, with such outputs correlatable to produce useful results. In the present example, the first signal is used to actuate a conventional front brake of a motorcycle 26, with the second analogue signal from the FSR 16, being electronically and adjustably correlatable with the first signal, used to actuate a rear brake 24 of the motorcycle 26 from a single input from the rider.

In different embodiment, the FSR 16 can be configured to be selectively relocatable on the grasping surface 14 to allow rider-customization according to requirements. For example, FIGS. 6 and 7 show different FSR designs that can be used. Of course, the FSR 16 can also be mounted within a suitable aperture of the lever body 12, or the like. The skilled addressee will appreciate that variations hereon are possible and within the scope of the present disclosure. For example, the FSR may be moved from the lever or pedal and placed anywhere required on the motorcycle, such as on a grip, on the handlebars, etc.

In one example, the FSR can be a "stick-on" type, which can be placed according to where a rider requires it. For instance, some riders use their index and middle fingers to pull a brake lever, so in one example the FSR can be located to be actuatable by the ring or little fingers, or the like. Again, variations hereon are envisaged and within the scope of the present disclosure. The FSR may take different shapes, depending on requirements, such as a thicker body for off-road motorcycles, or a thinner body for road motorcycles, etc.

Similarly, while a brake lever 10 is embodied herein, the skilled addressee will appreciate that a motorcycle brake pedal configuration is apposite, typically, comprising a pedal body defining a stepping surface whereby a rider is able to operatively apply pressure with a foot in order to produce a first analogue signal, and a force-sensitive resistor (FSR) mounted on and/or in the stepping surface, the FSR configured to produce a second analogue signal wherein pressure applied results in simultaneous production of the first and second signals, the second signal electronically correlatable with the first.

For example, a brake lever configuration as described herein may be more suited for racing motorcycles, whereas a brake pedal configuration may be more suited for cruiser-style motorcycles, or the like. Similarly, a motorcycle may be fitted with both brake lever and foot pedal configurations, requirements depending. While a brake lever is referenced herein, the skilled addressee will also appreciate that a clutch lever or gear lever is also apposite and may be similarly configured.

Referring now to FIGS. 1 to 4 of the accompanying drawings, there is shown a motorcycle braking arrangement 18, in accordance with an aspect of the present disclosure, which comprises a brake lever 10 (and/or brake pedal), as described above, along with a controller 20 configured to electronically correlate the second signal with the first in a predetermined manner. The arrangement 18 also includes at least one servomechanism 22, which is arranged in signal communication with the controller 20 and is configured to actuate a brake 24 of the motorcycle 26 according to the correlation between the first and second signals.

The servomechanism 22 may be arranged in wireless and/or wired signal communication with the controller 20. For example, the servomechanism 22 may be arranged in wired signal communication with the controller 20, such as via a suitable radio frequency, or the like. The servomechanism 22 and controller 20 may also include a wired connection for redundancy, or the like.

Typically, the braking arrangement 18 is configured such that the first signal actuates a brake on one wheel, with the servomechanism 22 configured to actuate a brake on another wheel according to the correlation, i.e., first signal actuates the front brake and the servomechanism actuates the rear brake according to the correlation, or vice versa.

Typically, the arrangement 18 includes an adjustor 28, which is arranged in signal communication with the controller 20 and is configured to adjust a ratio and/or manner in which the controller 20 correlates the second signal with the first. For example, in one embodiment the adjustor may be a potentiometer, or the like. In this manner, the adjustor 28 comprises a sensitivity adjustor, such as a potentiometer, which is configured to adjust a sensitivity of the FSR 16 thereby indirectly adjusting the correlation ratio between the first and second signals. The adjustor 28 is typically manually adjustable, but may also be automatically adjustable via the controller 20 in response to a sensor input, as described below.

In one embodiment, the arrangement 18 also includes at least one sensor 30, which is arranged in signal communication with the controller 20, and is configured to sense an operating characteristic of the motorcycle 26 and to adjust automatically a ratio in which the controller 20 correlates the second signal with the first according to such sensed operating characteristic. Such signal communication between the sensor 30 and controller 20 may be wired and/or wireless.

For example, the operating characteristic of the motorcycle 26 may include a velocity of the motorcycle, a lean angle of the motorcycle, a longitudinal orientation or inclination of the motorcycle, a loaded weight of the motorcycle, a presence of an object proximate the motorcycle, an immobilizer security condition of the motorcycle, an engine condition of the motorcycle, or the like. The skilled addressee will appreciate that the sensor 30 may be configured to sense any of a variety of operating characteristic of the motorcycle 26 and to adjust a ratio at which the controller 20 automatically correlates the second signal with the first accordingly.

For instance, the sensor 30 may sense a velocity of the motorcycle 26 and the controller 20 may automatically adjust the correlation of the ratio between the first and second signals, so that actuation of the front brake to the servomechanism actuating the rear brake is done at a 70:30 ratio when the motorcycle 26 travels above a certain speed, i.e., 30 km/h, so that braking distribution is done at 70% in the front and 30% at the rear. However, once the motorcycle 26 is travelling below 20 km/h, the correlation ratio may be automatically adjusted by the controller 20 to 50:50, or the like, where the rear wheel is less likely to lock-up and cause a skid, thereby leading to improved braking performance at lower speeds.

Similarly, the sensor 30 may sense a loaded weight of the motorcycle 26 and if a load exceeds a predetermined weight, the correlation ratio may be adjusted by the controller 20 to shift more braking applied by the servomechanism to the rear brake to improve braking performance. A further example may see the sensor 30 sensing a longitudinal orientation or inclination of the motorcycle and, if a "wheelie" or "wheel-stand" condition is sensed, the controller 20 may adjust the correlation ratio between the front and rear brakes so that the rear brake is not actuated at all should the front brake lever 10 be pulled in order to avoid any loss of control when performing a wheelie, or the like. Similarly, if the sensor 30 senses an immobilizer security condition of the motorcycle, which indicates that the motorcycle's immobilizer is active, the controller 20 may actuate the brake fully so that the motorcycle is more difficult to move, or the like.

The skilled addressee is to appreciate that other aspects form part of the present disclosure. For example, in an embodiment, the controller 20 may be configured to disengage a clutch of the motorcycle 26 according to a magnitude of the second signal and/or the correlation between the first and second signals, or the like. For example, if the sensor 30 senses that the motorcycle is lying on its side, the clutch may be automatically disengaged, the rear wheel locked, i.e., rear brake applied 100% with no first signal input, or the like. As the arrangement 18 is typically wired into an existing motorcycle's electrical system, arrangement 18 also typically incorporates an on/off switch 38 to prevent drain on the motorcycle's battery, as shown.

Figure 3:
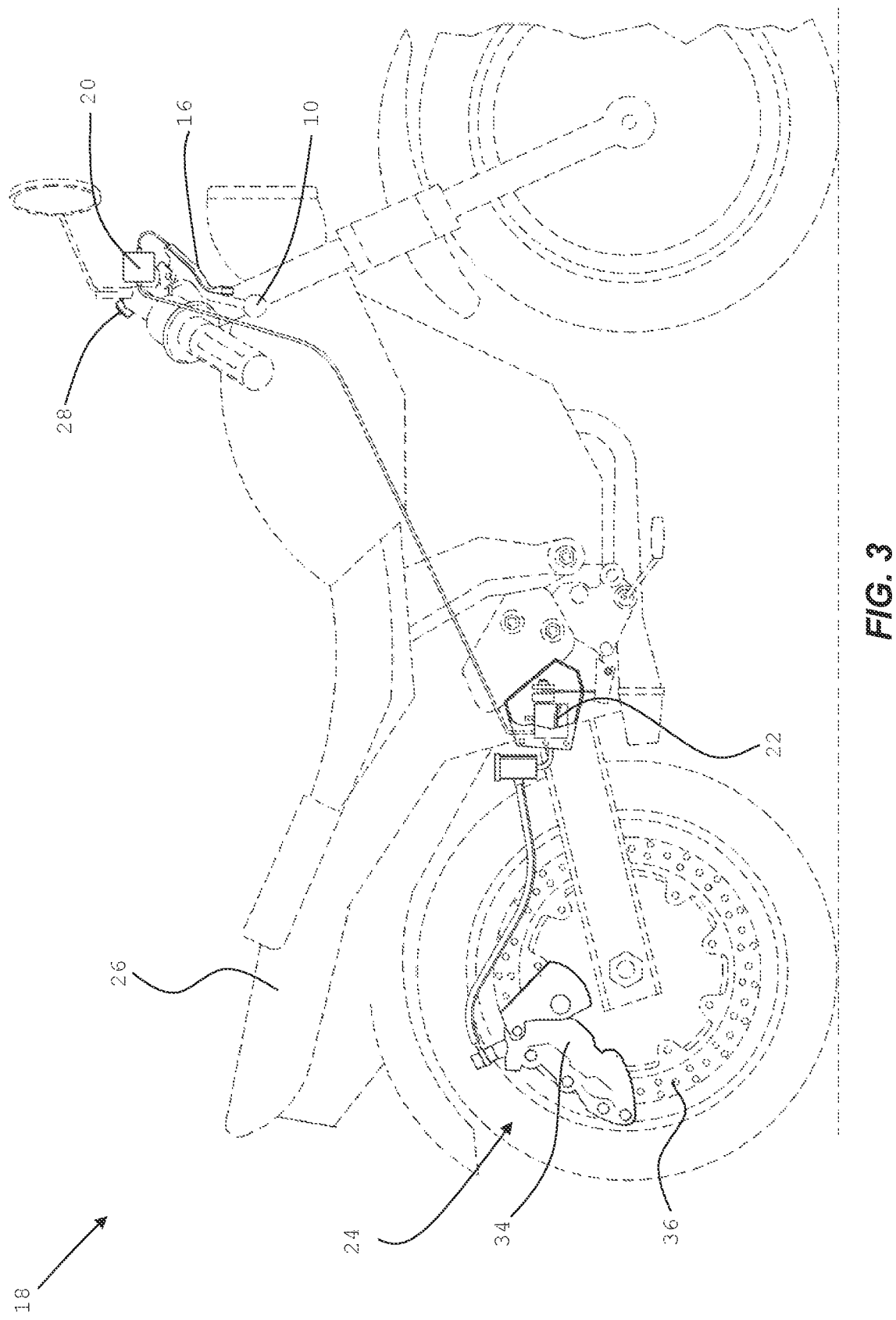
FIG. 3 is a diagrammatic side-view representation of a motorcycle showing one embodiment of the motorcycle braking arrangement of FIG. 1.

In the embodiment shown in FIG. 3, the servomechanism 22 is configured to engage with an existing brake system 24 of the motorcycle 26. In such an embodiment, the servomechanism 22 may be configured to actuate the existing brake system via a tension connection (rather than compression), such as cable 32 interacting with a conventional rear brake pedal, to minimize interference with normal manual actuation of the brake system. For example, by having the bendable cable "pulling" the lever as required to actuate the hydraulic brake system, a rider can still operate the rear brake normally without interference from the tensioned cable 32.

The servomechanism 22 of the embodiment shown in FIG. 3 also includes an off-center connection 40, as shown, whereby rotation of the servomechanism is translated to a translation force, e.g., to pull the brake pedal to actuate the brake system, or the like. The connection 40 further serves to reduce restriction in normal movement of the brake lever due to the play in the cable. It has been found that the JX Servo WP45 servomechanism by JX Servo Technology™ is suited to the current application, but other servomechanisms may be used.

Figure 4:
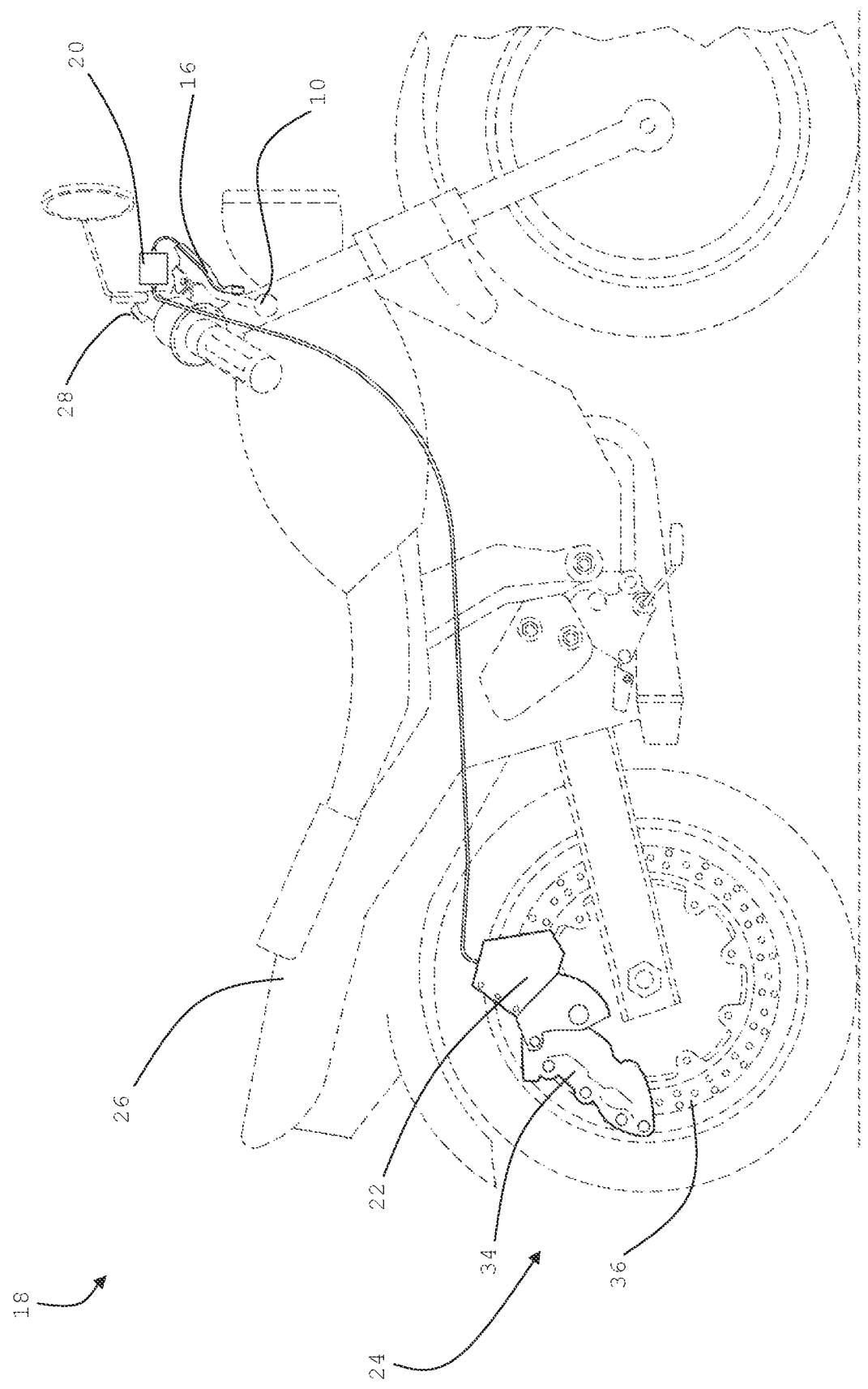
FIG. 4 is a diagrammatic side-view representation of a motorcycle showing a further embodiment of the motorcycle braking arrangement of FIG. 1.
Figure 9:
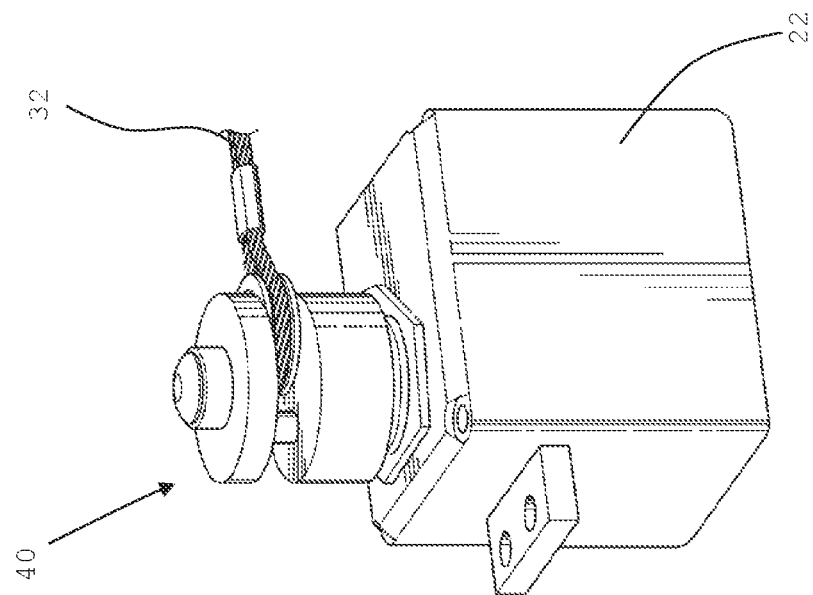
FIGS. 8 and 9 are diagrammatic representations of one embodiment of a servomechanism of the motorcycle braking arrangement of FIG. 1.
Figure 8:
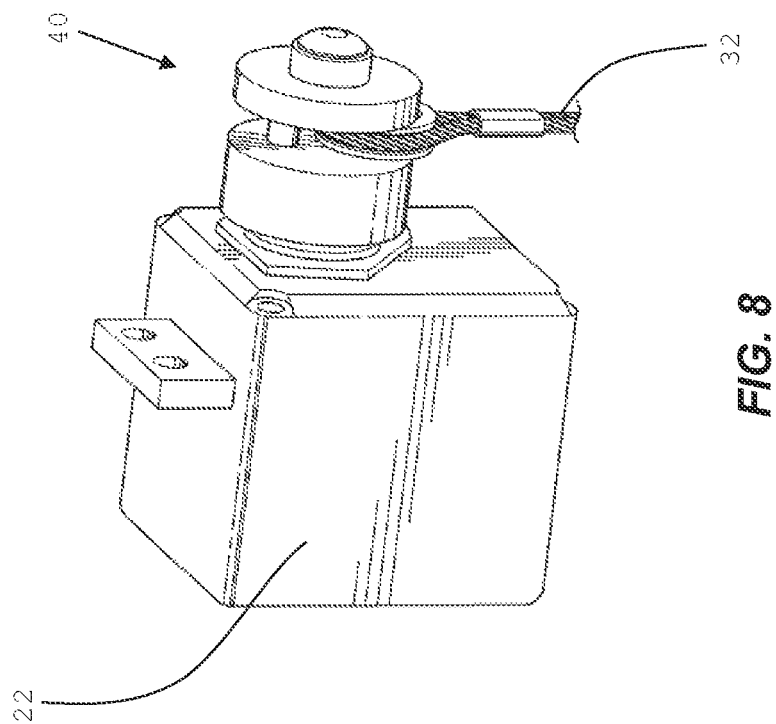

In another embodiment shown in FIG. 4, the servomechanism 22 is configured to directly actuate or engage a brake caliper 34 and/brake disc 36 of the motorcycle 26. In this manner, an entire conventional hydraulic braking system of a motorcycle 26 can be replaced with a "brake-by wire" system. In another embodiment, the servomechanism may be configured to engage with an existing hydraulic system of the motorcycle 26, with the sensor sensing hydraulic pressure as an operating characteristic, or the like.

In other embodiments, the controller 20 may be configured to activate a braking indicator of the motorcycle according to the correlation between the first and second signals. For example, a graded brake light system can be used to show the amount of pressure applied to the FSR 16, which may be useful in indicating a level of brake used rather than the conventional on/off brake light indicator.

It is believed that it is particularly advantageous that the present disclosure provides for correlated "analogue-on-analogue" signal production via the arrangements described herein, which typically leads to ergonomic and surprising motorcycle control results when implemented, as described. For example, a specific brake correlation between front and rear brake can be configured such that concerted brake pad design and replacement is possible, or the like.

In the manner described herein, the arrangement 18 allows a rider to adjust, via the adjustor 28, or configure the controller 20 to automatically adjust via sensor 30, a correlation between pressure applied to a brake pedal or lever for actuating one brake to automatically actuate another brake on a motorcycle 26. As a single analogue input produces two separate analogue signals, one correlated by controller 20 to operate servomechanism 22, analogue control with both signals can be achieved, meaning braking force can be evenly applied to both brakes, depending on requirements.

Such an arrangement is particularly useful in ensuring proper rear-brake use on road motorcycles, and finds particular application on off-road motorcycles where the rear brake can be controlled without requiring use of a rider's foot, which can be used to control the motorcycle instead.

Optional embodiments of the present disclosure may also be said to broadly consist in the parts, elements and features referred to or indicated herein, individually or collectively, in any or all combinations of two or more of the parts, elements or features, and wherein specific integers are mentioned herein, which have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, whilst other aspects are exemplified in a different example. These examples are intended to assist the skilled person in performing the disclosure and are not intended to limit the overall scope of the disclosure in any way unless the context clearly indicates otherwise. Variations (e.g., modifications and/or enhancements) of one or more embodiments described herein might become apparent to those of ordinary skill in the art upon reading this application. It is expected that skilled artisans will employ such variations as appropriate, and for the claimed subject matter to be practiced other than as specifically described herein.

The invention claimed is:

1. A motorcycle or bicycle braking arrangement comprising:
    a brake lever defining a grasping surface whereby a rider is able to apply pressure in order to produce a first signal, a force-sensitive resistor (FSR) mounted on and/or in the surface and configured to produce a second signal, wherein pressure applied results in simultaneous production of the first and second signals;
    a controller which includes an adjustor and is configured to electronically correlate the second signal with the first in a ratio and/or which is adjustable via the adjustor; and
    at least one servomechanism arranged in signal communication with the controller and configured to engage with and actuate an existing rear brake system of the motorcycle or bicycle according to the correlation between the first and second signals;
    wherein the braking arrangement is configured such that the first signal actuates a front brake for the front wheel of the motorcycle or bicycle, with the servomechanism configured to actuate a rear brake for the rear wheel according to the adjustable correlation.

2. The arrangement of claim 1, wherein the adjustor comprises a sensitivity adjustor configured to adjust a sensitivity of the FSR thereby indirectly adjusting the correlation ratio between the first and second signals.

3. The arrangement of claim 1, further comprising at least one sensor arranged in signal communication with the controller, the sensor configured to sense an operating characteristic of the motorcycle, the controller configured to automatically to adjust the ratio at which the second signal is correlated with the first according to such sensed operating characteristic.

4. The arrangement of claim 3, wherein the operating characteristic of the motorcycle or bicycle is selected from a non-exhaustive group consisting of a velocity of the motorcycle or bicycle, a lean angle of the motorcycle or bicycle, a longitudinal orientation of the motorcycle or bicycle, a loaded weight of the motorcycle or bicycle, a presence of an object proximate the motorcycle or bicycle, an immobilizer security condition of the motorcycle or bicycle, and an engine condition of the motorcycle or bicycle.

5. The arrangement of claim 1, wherein the servomechanism is configured to actuate the existing brake system via a tension connection to minimize interference with normal manual actuation of the brake system.

6. The arrangement of claim 5, wherein the servomechanism includes an off-center tension connection to the brake system, whereby rotation of part of the servomechanism is translated to a translation force to actuate the brake system.

7. The arrangement of claim 1, wherein the servomechanism is configured to directly actuate or engage a brake caliper and brake pad of the motorcycle or bicycle.

8. The arrangement of claim 1, wherein the controller is configured to activate a braking indicator of the motorcycle or bicycle according to the correlation between the first and second signals.

9. The arrangement of claim 1, wherein the controller is configured to disengage a clutch of the motorcycle according to a magnitude of the second signal and/or the correlation between the first and second signals.

10. The arrangement of claim 1, wherein the servomechanism is arranged in wireless signal communication with the controller.

11. The arrangement of claim 1, wherein the FSR is configured to be selectively relocatable on the surface to allow rider-customization according to requirements.

12. A motorcycle or bicycle including the arrangement of claim 1.

13. A motorcycle or bicycle brake lever comprising:
    a lever body defining a grasping surface whereby a rider is able to operatively apply pressure with at least one finger in order to produce a first signal; and a force-sensitive resistor (FSR) mounted on and/or in the grasping surface, the FSR configured to produce a second signal;

wherein pressure applied results in simultaneous production of the first and second signals, the second signal electronically correlatable with the first;

wherein the braking arrangement is configured such that the first signal actuates a front brake for a front wheel of the motorcycle or bicycle, with the second signal activating a servomechanism which is configured to actuate a rear brake for the rear wheel according to the adjustable correlation.

\* \* \* \* \*